G. E. WUNDER.
SPEED JACK.
APPLICATION FILED FEB. 6, 1911.
1,006,170.
Patented Oct. 17, 1911.
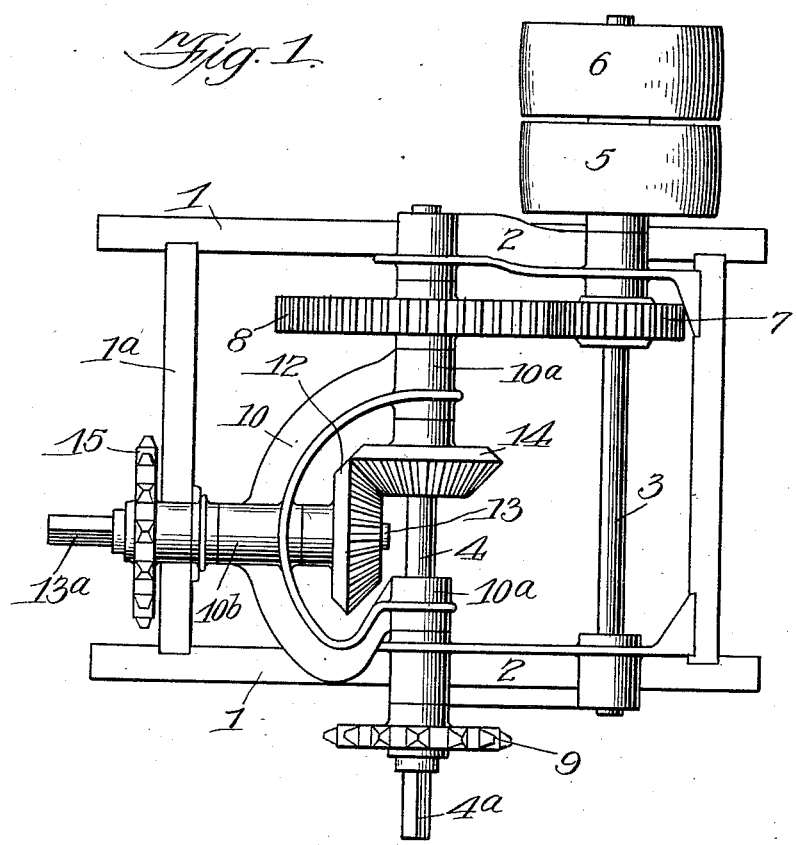
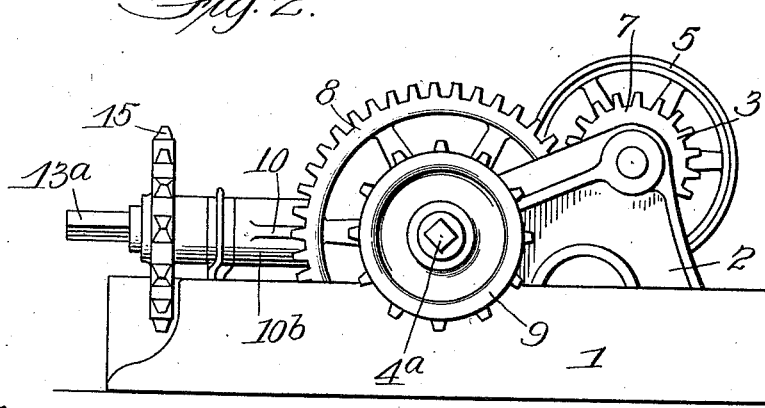
Witnesses:
P. J. Gathmann
M. Gertrude Ady
Inventor:
George E. Wunder
By Burton & Burton
his Attorneys

UNITED STATES PATENT OFFICE.

GEORGE E. WUNDER, OF PLANO, ILLINOIS, ASSIGNOR TO INDEPENDENT HARVESTER COMPANY, OF PLANO, ILLINOIS, A CORPORATION OF MAINE.

SPEED-JACK.

1,006,170.  Specification of Letters Patent.  Patented Oct. 17, 1911.

Application filed February 6, 1911. Serial No. 606,980.

*To all whom it may concern:*

Be it known that I, GEORGE E. WUNDER, a citizen of the United States, residing at Plano, in the county of Kendall and State of Illinois, have invented new and useful Improvements in Speed-Jacks, of which the following is a specification, reference being had to the accompanying drawings, forming a part thereof.

The purpose of this invention is to provide a portable power-transmission and speed-reducing gear train.

It consists of the features and elements described and shown in the drawings as indicated in the claim.

In the drawings Figure 1 is a top plan view of the device embodying this invention. Fig. 2 is a side elevation of the same.

This device is designed as a general utility transmission mechanism for use with any one of a large class of portable machines, such as farm machinery. It is designed to serve as a connection between such machines and a relatively high-speed engine or motor, and in addition, is arranged for transmitting power to shafts either parallel with the motor shaft or at right angles to it.

Upon the side members, 1, of the rectangular base frame there are secured brackets, 2, provided with journals for the shafts, 3 and 4. Outside of the frame, the shaft, 3, carries tight and loose pulleys, 5 and 6, respectively, intended to receive a belt from the engine or other source of power. A pinion, 7, on the shaft, 3, and a spur gear, 8, on the shaft, 4, compose the speed-reducing train. The shaft, 4, is squared at one end, $4^a$, for connection with the machine to be driven, and in addition there is provided a chain sprocket wheel, 9, to adapt the transmission mechanism for connection with machines arranged for chain drive. A yoke, 10, supported upon the shaft, 4, by its journals, $10^a$, and secured to a cross bar, $1^a$, of the base frame by a bracket, provides support for a miter gear, 12, carried on a shaft, 13, which is journaled in the portion, $10^b$, of the yoke. The miter gear, 12, is positioned to mesh with a similar gear, 14, rigidly secured on the shaft, 4, for transmitting power at the reduced speed and at right angles to the pulley shaft, 3. This short shaft, 13, is squared at $13^a$, similarly to the shaft, 4, at $4^a$, and is provided with a sprocket wheel, 15, similar to the sprocket wheel, 9, and intended for a like purpose.

It will be understood that in operation this device would be staked in position on the ground, or bolted in position on the floor of a building, in accordance with convenience, and that the engine or motor would be similarly positioned and connected by a belt over one of the pulleys on the shaft, 3. Opportunity would then be afforded for driving from one to four different machines simultaneously from a corresponding number of the driving connections,—namely, the squared ends, $4^a$ and $10^a$, of the shafts, 4 and 10, and the chain sprocket wheels, 9 and 15, respectively. Where it is desired to drive only one machine at a time, the device may be positioned in the most advantageous manner with respect to the directions of the driving and driven shafts of the power and the machine respectively.

I claim:—

A power-transmitting jack comprising a gear frame and a speed-reducing train therein having inleading and outleading shafts parallel, and the outleading shaft extending beyond the frame for transmitting power; a gear bracket journaled on said outleading shaft within the frame, and a third shaft journaled in said gear bracket and transversely to said outleading shaft, and also journaled in the frame and extending therebeyond, and therebeyond provided with means for driving connections.

In testimony whereof, I have hereunto set my hand, at Plano, Ill., this 30 day of January, 1911.

GEORGE E. WUNDER.

Witnesses:
CHAS. W. POWERS,
ROY LIESER.

Copies of this patent may be obtained for five cents each, by addressing the "Commissioner of Patents, Washington, D. C."